US010549345B2

(12) United States Patent
Pavlov et al.

(10) Patent No.: US 10,549,345 B2
(45) Date of Patent: Feb. 4, 2020

(54) CONTROL SYSTEM OF ADDITIVE MANUFACTURING SYSTEMS FOR CONTROLLING MOVEMENT OF SINTERING DEVICES AND RELATED PROGRAM PRODUCTS

(71) Applicant: General Electric Company, Schenectady, NY (US)

(72) Inventors: Mikhail Pavlov, Dietikon (CH); Kevin Peter Harvey, Nuneaton (GB)

(73) Assignee: General Electric Company, Schenectady, NY (US)

( * ) Notice: Subject to any disclaimer, the term of this patent is extended or adjusted under 35 U.S.C. 154(b) by 398 days.

(21) Appl. No.: 15/402,288

(22) Filed: Jan. 10, 2017

(65) Prior Publication Data
US 2018/0193917 A1    Jul. 12, 2018

(51) Int. Cl.
*B22F 3/105* (2006.01)
*B33Y 30/00* (2015.01)
*B33Y 50/02* (2015.01)

(52) U.S. Cl.
CPC ............ *B22F 3/1055* (2013.01); *B33Y 30/00* (2014.12); *B33Y 50/02* (2014.12); *B22F 2003/1057* (2013.01)

(58) Field of Classification Search
None
See application file for complete search history.

(56) References Cited

U.S. PATENT DOCUMENTS

| 6,676,892 B2 | 1/2004 | Das et al. |
| 9,358,635 B2 | 6/2016 | Bruck |
| 9,764,423 B2 * | 9/2017 | Hoebel .............. B23K 26/0093 |
| 9,789,563 B2 * | 10/2017 | Elfstroem .......... B23K 15/0086 |
| 2005/0242473 A1 * | 11/2005 | Newell ................. B29C 64/153 |
| | | 264/497 |
| 2014/0154088 A1 | 6/2014 | Etter et al. |

(Continued)

FOREIGN PATENT DOCUMENTS

| WO | 2015140547 A1 | 9/2015 |
| WO | 2016079496 A2 | 5/2016 |

*Primary Examiner* — Jacob T Minskey
*Assistant Examiner* — Baileigh Kate Darnell
(74) *Attorney, Agent, or Firm* — Dale Davis; Hoffman Warnick LLC

(57) ABSTRACT

Additive manufacturing systems are disclosed. The additive manufacturing system may include a sintering device configured to sinter a powder material to form a component, and an actuator coupled to the sintering device. The actuator may adjust a position of the sintering device. Additionally, the system may include at least one computing device operably connected to the actuator and the sintering device. The at least one computing device may control a movement of the sintering device by performing processes including determining an exposure pattern for the sintering device for sintering the powder material based on a geometry of the component. The exposure pattern may include at least one exposure track extending between two sides of the component. The computing device(s) may also perform processes including moving the sintering device, using the actuator, in the determined exposure pattern to sinter the powder material to form the component.

20 Claims, 13 Drawing Sheets

(56) References Cited

U.S. PATENT DOCUMENTS

| | | | |
|---|---|---|---|
| 2014/0163717 A1* | 6/2014 | Das | B22F 3/1055 700/119 |
| 2014/0242400 A1 | 8/2014 | Hoebel et al. | |
| 2014/0295087 A1 | 10/2014 | Rickenbacher et al. | |
| 2015/0086409 A1* | 3/2015 | Hellestam | B22F 3/1055 419/55 |
| 2015/0088292 A1 | 3/2015 | Inoue et al. | |
| 2015/0090074 A1 | 4/2015 | Etter et al. | |
| 2015/0174695 A1 | 6/2015 | Elfstroem et al. | |
| 2017/0014904 A1* | 1/2017 | Brown | B22F 3/1055 |

\* cited by examiner

CONTROL SYSTEM OF ADDITIVE MANUFACTURING SYSTEMS FOR CONTROLLING MOVEMENT OF SINTERING DEVICES AND RELATED PROGRAM PRODUCTS

BACKGROUND OF THE INVENTION

The disclosure relates generally to additive manufacturing systems, and more particularly, to moving a sintering device of an additive manufacturing system between two sides of a component to sinter a powder material when forming the component.

Components or parts for various machines and mechanical systems may be built using additive manufacturing systems. Additive manufacturing systems may build such components by continuously layering powder material in predetermined areas and performing a material transformation process, such as sintering or melting, on the powder material. The material transformation process may alter the physical state of the powder material from a granular composition to a solid material to build the component. The components built using the additive manufacturing systems have nearly identical physical attributes as conventional components typically made by performing machining processes on stock material but certain geometrical features (form) can be only obtained through additive manufacturing methods.

Forming the components using the conventional additive manufacturing systems require a significant amount of build-time. This may be especially true when the component is large and includes a large number of layers and/or when the geometry of the component is complex. Components are formed by sintering the powder material using a plurality of hatch patterns. Specifically, a sintering device may sinter each layer of the powder material forming the component by following a specifically generated hatch pattern. The area of a component to be sintered within each layer represents and/or is formed using the hatch pattern. The hatch pattern includes a plurality of individual stripes and/or individual lines of the sintered or melted powder material with a predetermined width, shorter than the dimension(s) (e.g., width, length, depth and so on) of the entire component. The stripes may be formed by operating (e.g., turning on) the sintering device over a predetermined distance (e.g., stripe width), shutting down the sintering device (e.g., turning off), repositioning the sintering device to form another stripe of the same hatch pattern and operating the sintering device again. This process is repeated until all stripes of the hatch pattern are formed, and then repeated again to form a distinct hatch pattern on the component. The operational down time of the sintering device (e.g., shutting down and repositioning) each time a stripe if formed using the conventional process accounts for a significant amount of build time for the component. Additionally, in the areas of the component that include unique features (e.g., angled side walls) individual stripes or lines of the hatch pattern may be shortened to compensate for the change in geometry of the component based on the unique features. As a result, the area of the component including the shortened stripes or lines may be more susceptible to defects.

BRIEF DESCRIPTION OF THE INVENTION

A first aspect of the disclosure provides an additive manufacturing system including: a sintering device configured to sinter a powder material to form a component; an actuator coupled to the sintering device, the actuator configured to adjust a position of the sintering device; and at least one computing device operably connected to the actuator and the sintering device, the at least one computing device configured to control a movement of the sintering device by performing processes including: determining an exposure pattern for the sintering device for sintering the powder material based on a geometry of the component, the exposure pattern including at least one exposure track extending between two sides of the component; and moving the sintering device, using the actuator, in the determined exposure pattern to sinter the powder material to form the component.

A second aspect of the disclosure provides a computer program product including program code, which when executed by at least one computing device, causes the at least one computing device to control a movement of a sintering device of an additive manufacturing system, by performing processes including: determining an exposure pattern for the sintering device based on a geometry of a component formed from a powder material by the sintering device, the exposure pattern including at least one exposure track extending between two sides of the component; and moving the sintering device in the determined exposure pattern to sinter the powder material to form the component.

A third aspect of the disclosure provides a system including: at least one computing device operably connected to a sintering device and an actuator of an additive manufacturing system, the at least one computing device configured to control a movement of the sintering device by performing processes including: determining an exposure pattern for the sintering device based on a geometry of a component formed from a powder material by the sintering device, the exposure pattern including: a plurality of exposure tracks positioned substantially non-intersecting to each other, at least a majority of the plurality of exposure tracks of the exposure pattern extending between two sides of the component; and moving the sintering device, using the actuator, in the determined exposure pattern to sinter the powder material to form the component.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within additive manufacturing systems. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure relates generally to additive manufacturing systems, and more particularly, to moving a sintering device of an additive manufacturing system between two sides of a component to sinter a powder material when forming the component.

These and other embodiments are discussed below with reference to FIGS. 1-13. However, those skilled in the art will readily appreciate that the detailed description given herein with respect to these Figures is for explanatory purposes only and should not be construed as limiting.

Figure 1:
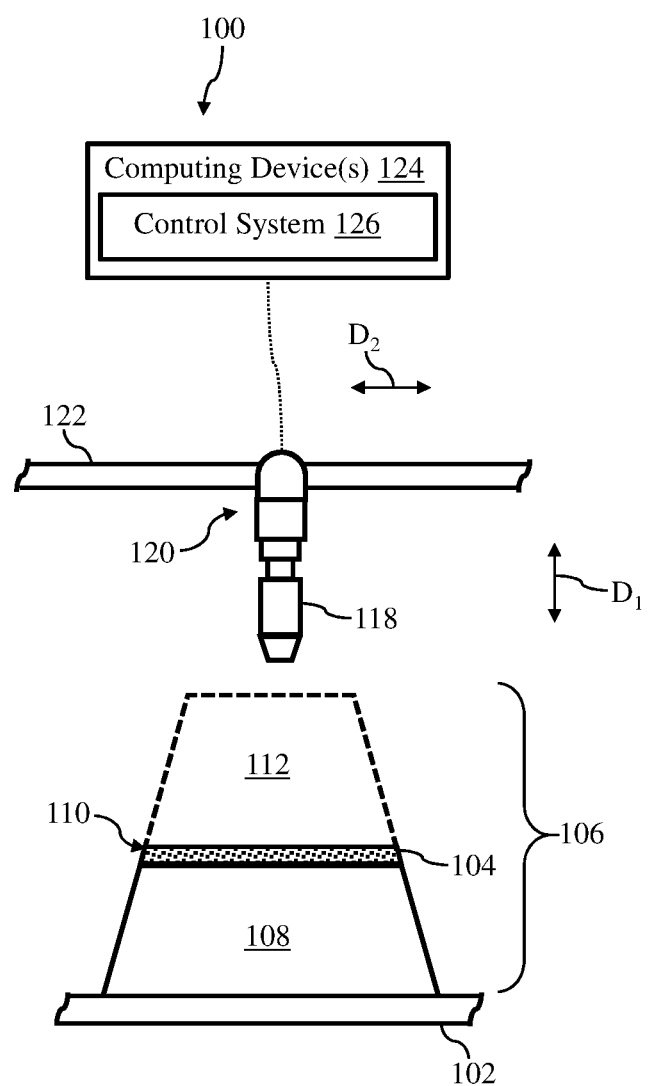
FIG. 1 depicts a front view of an additive manufacturing system including a sintering device and an actuator, a computing device(s) and a portion of a component, according to embodiments.
Figure 2:
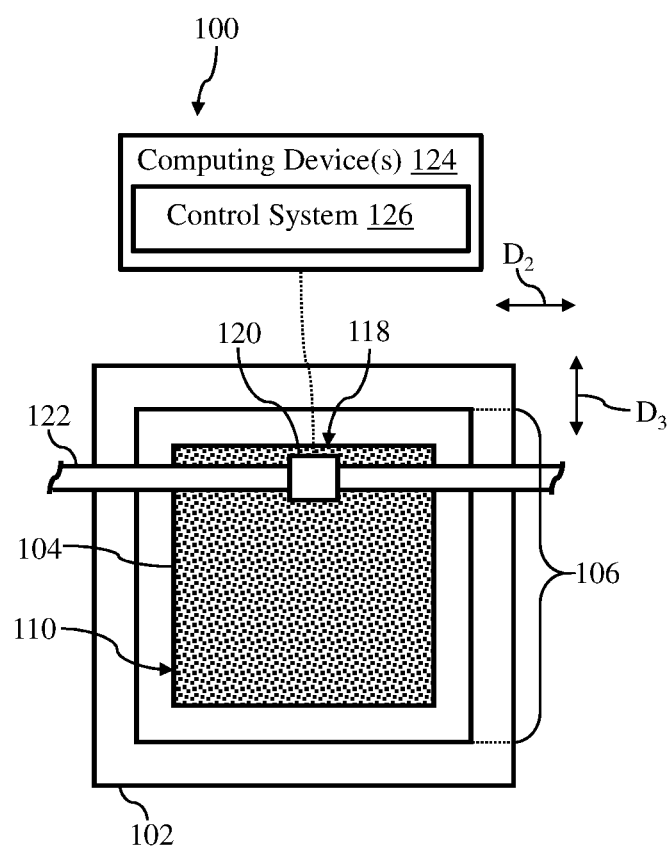
FIG. 2 depicts a top view of the additive manufacturing system, computing device(s) and the portion of the component of FIG. 1, according to embodiments.

Turning to FIGS. 1 and 2, a front and top view, respectively, of an additive manufacturing system 100 is shown. Additive manufacturing system 100 (hereafter, "AMS 100") may include a build platform 102. In a non-limiting example, build platform 102 may be positioned or disposed within an enclosure or chamber (not shown), such that the enclosure may substantially surround build platform 102. Build platform 102 may include a build plate (not shown), a build surface and/or build structure for receiving a powder material 104 (single layer shown) that may be utilized by AMS 100 to form a sintered component 106. As discussed in detail herein, build platform 102 may receive powder material 104 and may provide a build structure for sintered component 106 formed from powder material 104 using AMS 100.

Build platform 102 may be formed from any suitable material that may receive and/or support powder material 104 and/or sintered component 106 formed from powder material 104, as discussed herein. In non-limiting examples, build platform 102 may be formed from a substantially rigid material(s) including, but not limited to, metal, metal alloys, ceramic and so on. The size and/or geometry of build platform 102 of AMS 100 may be dependent on, at least in part, the amount of powder material 104 utilized by AMS 100 to form sintered component 106, the size of sintered component 106 and/or the geometry of sintered component 106 formed by AMS 100.

In the non-limiting example shown in FIG. 1, sintered component 106 may be shown as incomplete or not completely build using AMS 100. Specifically, sintered component 106 shown in FIG. 1 may be partially build by AMS 100 and/or may be have undergone only a portion of the processes, discussed herein, for forming complete, sintered component 106 using AMS 100. In the non-limiting example, sintered component 106 may include a sintered portion 108, a layer 110 of powder material 104 formed over and/or disposed on sintered portion 108, and anticipated and/or unbuilt layers or portion 112 (shown in phantom). As discussed in detail herein, sintered portion 108, along with the remainder of sinter component 106, may be formed by continuously and/or repeatedly depositing a layer (e.g., layer 110) of powder material 104, and subsequently sintering the layer of powder material 104 using sintering device 118 of AMS 100. As such, sintered portion 108 may be formed from a plurality of sintered layers of powder material 104. Additionally, layer 110 of powder material 104 may be an unsintered or pre-sintered layer of powder material 108 that may become part of sintered portion 108 of sintered component 106 after being sintered by sintering device 118, as discussed herein.

Powder material 104 may be formed from a material(s) or powder material(s) that is capable of being manipulated, deposited and subsequently sintered when heated. In non-limiting examples, powder material 104 may be formed from steel, titanium, gold, silver, various metal alloys and/or other metal compounds having similar properties and/or characteristics. Additionally, it is understood that the geometry and/or features for sintered component 106 depicted in FIGS. 1 and 2 are merely illustrative. As such, sintered component 106 may include a variety of features that are unique and/or crucial for the use of component 106 once formed by AMS 100. As discussed herein, these variety of features may defined, modeled and/or created using, for example, computer aided design (CAD) software prior to building sintered component 106 using AMS 100 and may be subsequently formed during the layering of powder material 104 and subsequent sintering of each layer (e.g., layer 110) of powder material 104. Additionally, and as discussed herein, the features and/or geometry of sintered component 106, and specifically each layer (e.g., layer 110) forming sintered component 106, may effect and/or determine a movement of sintering device 118 when forming and/or sintering each layer of powder material 104.

AMS 100 may also include sintering device 118. As shown in FIGS. 1 and 2, sintering device 118 of AMS 100 may be positioned substantially above build platform 102 and/or component 106. As discussed herein, sintering device 118 may be positioned above build platform 102 in order to form sintered component 106. Sintering device 118 may be any suitable device configured to and/or capable of forming component 106. Specifically, sintering device 118 may be configured to and/or capable of sintering powder material 104, layer-by-layer (e.g., layer 110), to form component 106, as discussed herein. In a non-limiting example shown in FIG. 1, sintering device 118 may be any suitable laser or laser device configured to emit light capable of sintering powder material 104. In other non-limiting examples (not shown), sintering device 118 may include any other suitable radiant energy device configured to sinter powder material 104 including, but not limited to, a heat source, a radiation-emitting device, a microwave-emitting device and the like.

One sintering device 118 is shown and discussed herein with respect to AMS 100. However, it is understood that the number of sintering devices of AMS 100 shown in the figures is merely illustrative. As such, AMS 100 may include more or less sintering device(s) 118 than the number depicted and discussed herein.

As shown in FIGS. 1 and 2, AMS 100 may also include at least one actuator 120. Actuator 120 of AMS 100 may be coupled to sintering device 118. More specifically, actuator 120 of AMS 100 may be coupled to sintering device 118 and may be configured to adjust a position of sintering device 118 when forming component 106. In a non-limiting example shown in FIGS. 1 and 2, actuator 120 may also be coupled to a track or track system 122 positioned above build platform 102 of AMS 100. Track system 122 may also aid in adjusting a position of sintering device 118. Specifically in the non-limiting example, actuator 120 and/or track system 122 may be configured and/or utilized to move sintering device 118 in various directions (D) to adjust the position of sintering device 118 when forming component 106. As shown in FIG. 1, actuator 120 may be a hydraulic or telescoping actuator that may be configured to move sintering device 118 in a first direction ($D_1$) when sintering powder material 104 and/or forming component 106. Additionally, as shown in FIGS. 1 and 2, actuator 120 may also be configured to move along and/or across track system 122 and ultimately move sintering device 118 in a second direction ($D_2$) when sintering powder material 104 and/or forming component 106. Finally, and as shown in FIG. 2, track system 122 may be configure to move and/or carry actuator 120 and sintering device 118 in a third direction ($D_3$) when sintering powder material 104 and/or forming component 106.

Although shown and discussed herein to include actuator 120 and track system 122, AMS 100 may include any suitable component and/or system configured to adjust the position of sintering device 118 when sintering powder material 104 and/or forming component 106. For example, actuator 120 may be coupled and/or fixed to a moveable armature that may adjust the position of actuator 120 and/or sintering device 118 in the first direction ($D_1$), the second direction ($D_2$) and/or the third direction ($D_3$). In another non-limiting example, an actuator may also be coupled to build platform 102, and may be configured to adjust the position of build platform 102 with respect or relation to sintering device 118.

AMS 100 may also include at least one computing device 124 configured to control a movement of sintering device 118. Computing device(s) 124 may be hard-wired, wirelessly and/or operably connected to and/or in communication with various components of AMS 100 via any suitable electronic and/or mechanic communication component or technique. Specifically, computing device(s) 124 may be in electrical communication and/or operably connected to sintering device 118 and/or actuator 120. Computing device(s) 124, and its various components discussed herein, may be a single stand-alone system that functions separate from an operations system of AMS 100 (e.g., computing device) (not shown) that may control and/or adjust at least a portion of operations and/or functions of AMS 100, and its various components (e.g., build platform 102, sintering device 118, actuator 120, track system 122 and so on). Alternatively, computing device(s) 124 and its components may be integrally formed within, in communication with and/or formed as a part of a larger control system of AMS 100 (e.g., computing device)(not shown) that may control and/or adjust at least a portion of operations and/or functions of AMS 100, and its various components. In various embodiments, computing device(s) 124 can include a control system 126 for controlling movement of sintering device 118. As discussed herein control system 126 can control the movement of sintering device 118 of AMS 100 during a sintering process to form sintered component 106 by moving sintering device according to a determined, exposure pattern.

Figure 3:
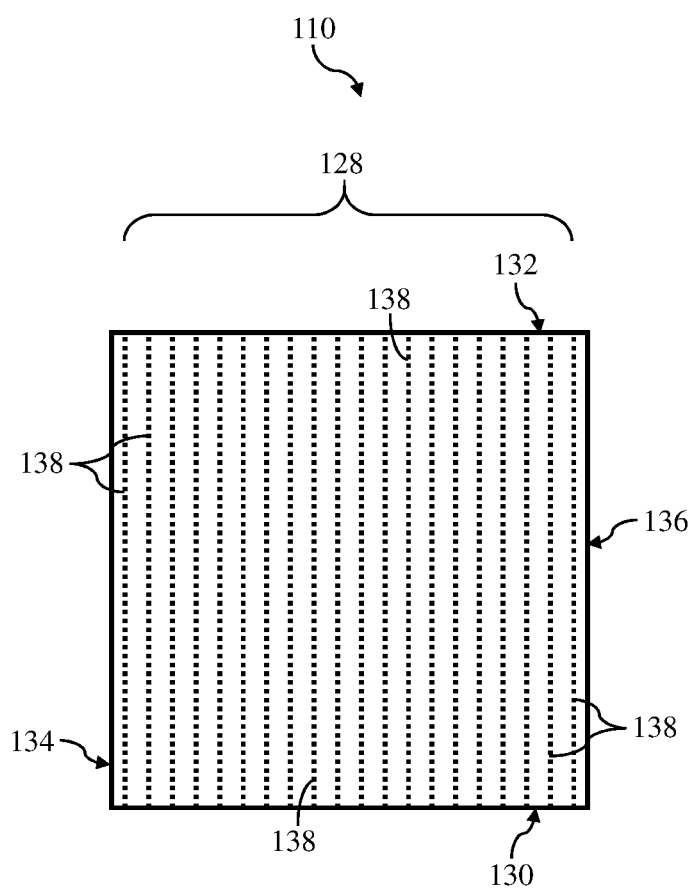
FIG. 3 depicts a top view of the component of FIG. 1 including an unsintered layer of powder material and an exposure pattern for the sintering device of the additive manufacturing system, according to embodiments.

Turning to FIG. 3, a top view of layer 110 of component 106 formed from powder material 104 (see, FIGS. 1 and 2) is shown, including a determined exposure pattern 128 (shown in phantom). Exposure pattern 128 may represent a sintering pattern for sintering device 118 of AMS 100 when forming and/or sintering layer 110 of powder material 104. That is, and as discussed herein, exposure pattern 128 may be a sintering pattern and/or a movement path for sintering device 118 when sintering device 118 performs the process of sintering powder material 104 (see, FIGS. 1 and 2) to form at least one layer (e.g., layer 110) of sintered component 106. In a non-limiting example, exposure pattern 128 may be substantially the same for each layer of sintered component 106 (see, FIGS. 7 and 8). In another non-limiting example, at least one layer of sintered component 106 may include a unique and/or distinct exposure pattern (see, FIG. 9) for sintering device 118.

Exposure pattern 128 for layer 110 may be determined based on the geometry of sintered component 106. Specifically, exposure pattern 128 for sintering device 118 may be based on and/or dependent on each layer (e.g., layer 110) forming sintered component 106, and the respective geometry and/or features of each layer forming sintered component 106. In a non-limiting example, AMS 100, and specifically computing device(s) 124 and/or control system 126, may define a plurality of layers (e.g., layer 110) of powder material 104 that may be build and sintered individually to form sintered component 106, and may determine of the geometry and/or features of each of the defined plurality of layers. AMS 100, and its components (e.g., computing device(s) 124 and/or control system 126) may define the plurality of layers and determine the geometry and/or features of the plurality of layers forming sintered component 106 by analyzing, for example, the program code, data and/or CAD software information relating to sintered component 106. Using the determined and defined geometry and/or feature for each layer used to form sintered component 106, AMS 100 may determine, generate and/or create exposure pattern 128 for each layer of sintered component 106. In a non-limiting example shown in FIG. 3, AMS 100, and specifically computing device(s) 124 and/or control system 126, may determine layer 110 is substantially quadrilateral and/or a square. Additionally in the non-limiting example, AMS 100 and its components (e.g., computing device(s) 124 and/or control system 126) may determine and/or identify boundaries, a perimeter, exterior surfaces and/or sides 130, 132, 134, 136 of layer 110 of sintered component 106 (see, FIG. 1). Using the determined and/or defined geometry and/or feature information for layer 110 (e.g., sides 130, 132, 134, 136), AMS 100, and more specifically computing device(s) 124 and/or control system 126, may generate exposure pattern 128 based on the determined and/or defined geometry, as discussed herein.

As shown in FIG. 3, exposure pattern 128 may include at least one exposure track 138 (shown in phantom). Specifically, exposure pattern 128 for sintering device 118 may include and/or be formed as at least one exposure track 138 on layer 110. Exposure track(s) 138 of exposure pattern may represent a stripe, line and/or path of sintered, powder material 104 (see, FIGS. 6 and 7) formed by sintering device 118 of AMS 100 when forming and/or sintering layer 110. Exposure track(s) 138 of exposure pattern 128 may extend between ends, boundaries, a perimeter and/or sides 130, 132, 134, 136 of layer 110 and/or component 106. Specifically, and as shown in FIG. 3, exposure track(s) 138 of exposure pattern 128 may extend completely and/or continuously between at least two sides 130, 132 of layer 110 and/or component 106. As a result of exposure track(s) 138 extending completely and/or continuously between sides 130, 132 of layer 110, exposure tracks(s) 138 of exposure pattern 128 may not be segmented, divided, split-up and/or separated between two sides 130, 132 of layer 110.

Additionally, exposure track(s) 138 of exposure pattern 128 may be positioned, angled, extend and/or include an (angular) orientation between sides 130, 132 of layer 110. That is, exposure track(s) 138 forming exposure pattern 128 may be oriented and/or extend in a predetermined orientation on layer 110 of component 106. The orientation of exposure track(s) 138 extending between sides 130, 132 of layer 110 may be dependent, at least in part, characteristics of component 106 including, but not limited to, the size of component 106, the area of layer 110 including exposure track(s) 138/exposure pattern 128, the determined features and/or geometry of layer 110 of component 106, the position of layer 110 with respect to overall component 106 (e.g., bottom third of component 106, middle third of component 106, top third of component 106, top/exposed layer of component 106 and so on), orientation of exposure track(s) of exposure patterns for surrounding/adjacent layers of component 106 and the like. In the non-limiting example shown in FIG. 3, exposure track(s) 138 of exposure pattern 128 may bet oriented to extend only between sides 130, 132 as a result of layer 110 being substantially square (e.g., geometry), and/or because adjacent layers of component 106 may include exposure patterns having exposure track(s) extend in a similar (see, FIG. 8) or distinct (see, FIG. 9) orientation and/or angle.

In the non-limiting example shown in FIG. 3, exposure pattern 128 may include a plurality of exposure tracks 138. Each of the plurality of exposure tracks 138 may be positioned, angled, extend and/or include an (angular) orientation that is substantially similar or identical to distinct exposure tracks 138. Specifically, the plurality of exposure tracks 138 may be positioned adjacent one another, and/or spaced evenly from one another. Additionally, the plurality of exposure tracks 138 may be positioned, oriented and/or formed to be substantially non-intersecting and/or parallel to one another. That is, the plurality of exposure tracks 138 may be formed to be non-intersecting with one another, such that no exposure tracks 138 of exposure pattern 128 may cross, overlap, interfere and/or encroach on a path of a distinct exposure track 138. In the non-limiting example shown in FIG. 3, each of the plurality of exposure tracks 138 may be formed and/or oriented to extend only between sides 130, 132. As a result of the features and/or geometry (e.g., square) of layer 110 of component 106 (see, FIGS. 1 and 2), each of the plurality of exposure tracks 138 may also be formed and/or oriented to extend substantially parallel to sides 134, 136 of component 106. Similar to the positioning and/or orientation of exposure track(s) 138 of exposure pattern 128, the number of exposure tracks 138 forming exposure pattern 128 may be dependent, at least in part, on characteristics of component 106 including, but not limited to, the size of component 106, the area of layer 110 including exposure track(s) 138/exposure pattern 128, the determined features and/or geometry of layer 110 of component 106, the position of layer 110 with respect to overall component 106 (e.g., bottom third of component 106, middle third of component 106, top third of component 106, top/exposed layer of component 106 and so on), orientation of exposure track(s) of exposure patterns for surrounding/adjacent layers of component 106 and the like.

As discussed herein, exposure track(s) 138 of exposure pattern 128 may represent a stripe, line and/or path of sintered, powder material 104 (see, FIGS. 6 and 7) formed by sintering device 118 of AMS 100 when forming and/or sintering layer 110. In a non-limiting example, and as discussed herein, sintering exposure track(s) 138 to form sintered tracks (see, FIGS. 6 and 7) may result in sintering an internal or "core" portion of layer 110 and/or component 106. This may be achieved by not allowing exposure track(s) 138 to extend into and/or beyond the ends, boundaries, perimeter and/or sides 130, 132, 134, 136, and/or stopping prior to reaching an outer surface of component 106.

Figure 4:
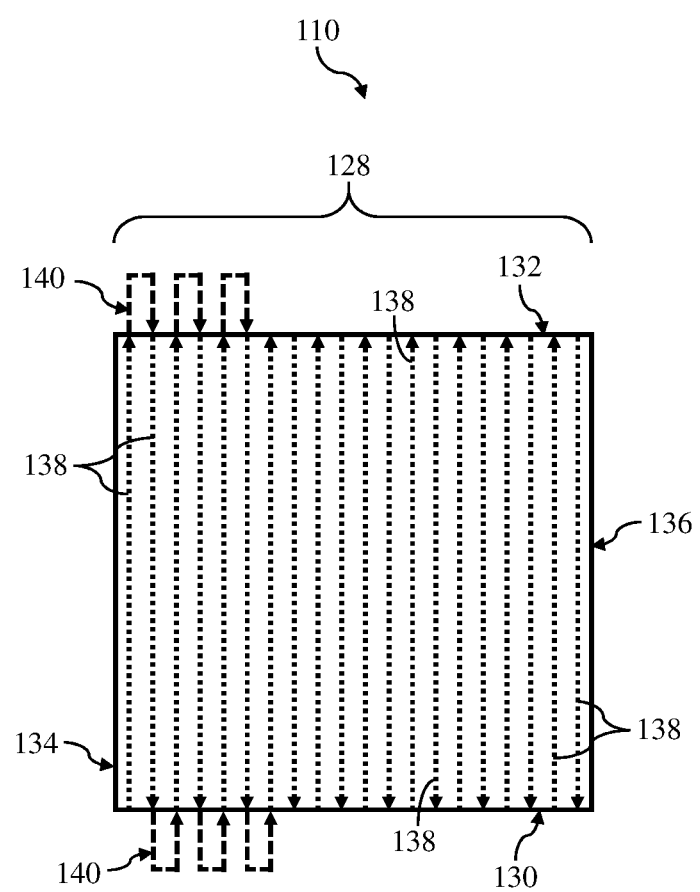
FIG. 4 depicts a top view of the component of FIG. 1 including an unsintered layer of powder material and a path of movement of the sintering device following the exposure pattern of FIG. 3, according to embodiments.
Figure 5:
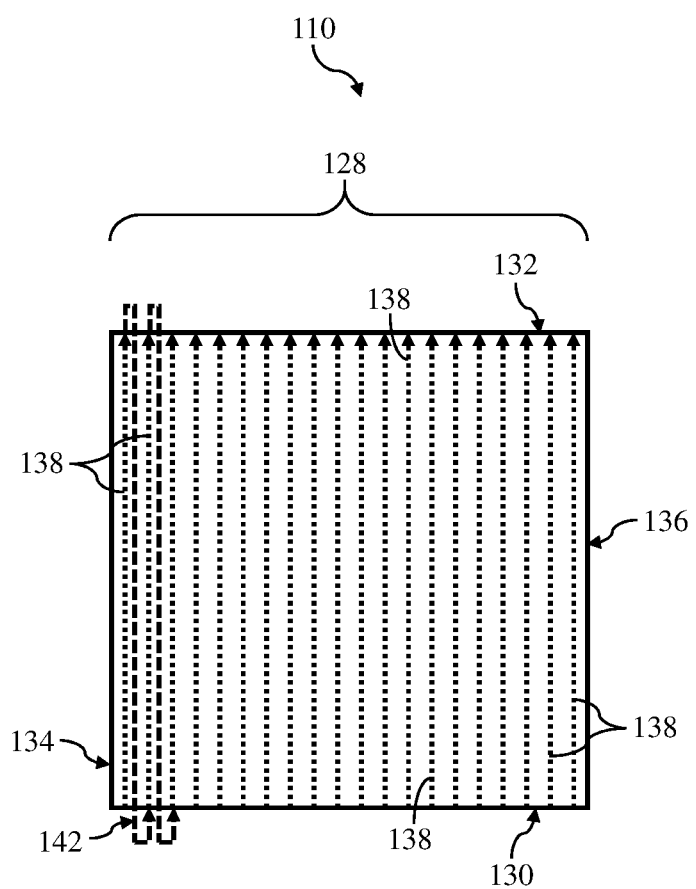
FIG. 5 depicts a top view of the component of FIG. 1 including an unsintered layer of powder material and a path of movement of the sintering device following the exposure pattern of FIG. 3, according to additional embodiments.

FIGS. 4 and 5 depict distinct, non-limiting examples of a path of movement of sintering device 118 (see, FIGS. 1 and 2) following exposure pattern 128 when sintering layer 110 of component 106 (see, FIGS. 1 and 2). In the non-limiting examples, the depicted arrows may indicate and/or represent a direction of movement of sintering device 118 when following and/or moving in accordance with exposure pattern 128, as discussed herein. It is understood that similarly numbered and/or named components may function in a substantially similar fashion. Redundant explanation of these components has been omitted for clarity.

In the non-limiting example shown in FIG. 4, sintering device 118 may alternate and/or change direction when moving to follow exposure pattern 128. That is, when moving sintering device 118 in determined exposure pattern 128, the direction or path of movement may alternate for each of the plurality of exposure tracks 138 forming exposure pattern 128. For example, and as shown in FIG. 4, sintering device 118 may move from side 130 to side 132 when forming exposure track 138 that is positioned directly adjacent and/or closest to side 134. Sintering device 118 may be repositioned adjacent exposure track 138 positioned directly adjacent and/or closest to side 134 and may move toward side 136 by following a turn path 140. By following turn path 140, sintering device 118 may be repositioned to form a distinct exposure track 138 for exposure pattern 128. After being repositioned and/or moving along turn path 140, sintering device 118 may subsequently move from side 132 to side 130 to form a distinct and/or adjacent exposure track 138, as shown in FIG. 4. Sintering device 118 may repeatedly follow the path of movement (e.g., side 130 to side 132, turn path 140, side 132 to side 130, turn path 140, and so on) depicted in FIG. 4 until all exposure tracks 138 of exposure pattern 128 are followed and/or powder material 104 is sintered to form layer 110 of component 106, as discussed herein.

In another non-limiting example shown in FIG. 5, sintering device 118 may only move in a single direction across layer 110 when moving in determined exposure pattern 128. That is, and distinct from the non-limiting example shown and discussed herein with respect to FIG. 4, exposure track(s) 138 shown in the non-limiting example in FIG. 5 all originate and/or start at first side 130 of layer 110 and move from first side 130 to second side 132 when forming each of the plurality of exposure tracks 138 of exposure pattern 128. After moving and/or forming each exposure track 138 of exposure pattern 128, sintering device 118 may follow a return path 142 from side 132 back to side 130 to form a distinct and/or adjacent exposure track 138. Specifically, sintering device 118 may move from side 132 back to side 130 and may be repositioned adjacent previously formed exposure track 138 and may move toward side 136 by following return path 142. After being repositioned and/or moving along return path 142, sintering device 118 may subsequently move from side 130 to side 132 again, in its new position, to form a distinct and/or adjacent exposure track 138, as shown in FIG. 5. Sintering device 118 may repeatedly follow the path of movement (e.g., side 130 to side 132, return path 142, side 130 to side 132, return path 142, and so on) depicted in FIG. 5 until all exposure tracks 138 of exposure pattern 128 are followed and/or powder material 104 is sintered to form layer 110 of component 106, as discussed herein.

Although being formed in order, sequentially and/or one-after-another, it is understood that sintering device 118 may move in a random path and/or in an unsequential order. That is, and as discussed herein in detail, sintering device 118 following exposure pattern 128 may move in a similar pattern shown in the non-limiting examples of FIG. 5 or 6, but may "skip" or move past at least one adjacent or consecutive exposure track 138. For example, sintering device 118 may follow a similar movement path discussed herein with respect to FIG. 5, however, when sintering device 118 moves to follow turn 140, sintering device 118 may skip or move past a directly adjacent exposure track 138 and may move to a distinct exposure track 138 positioned further from the previously formed exposure track 138.

Figure 6:
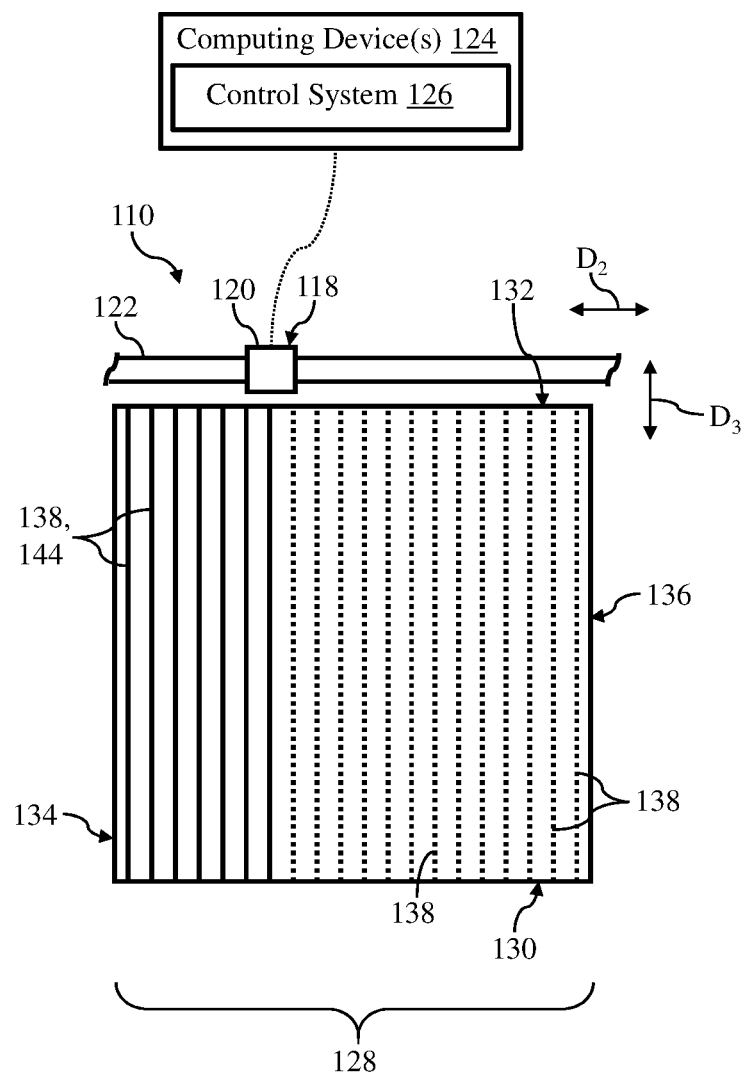
FIGS. 6 and 7 depict top views the component of FIG. 1 undergoing a sintering process, according to embodiments.
Figure 7:
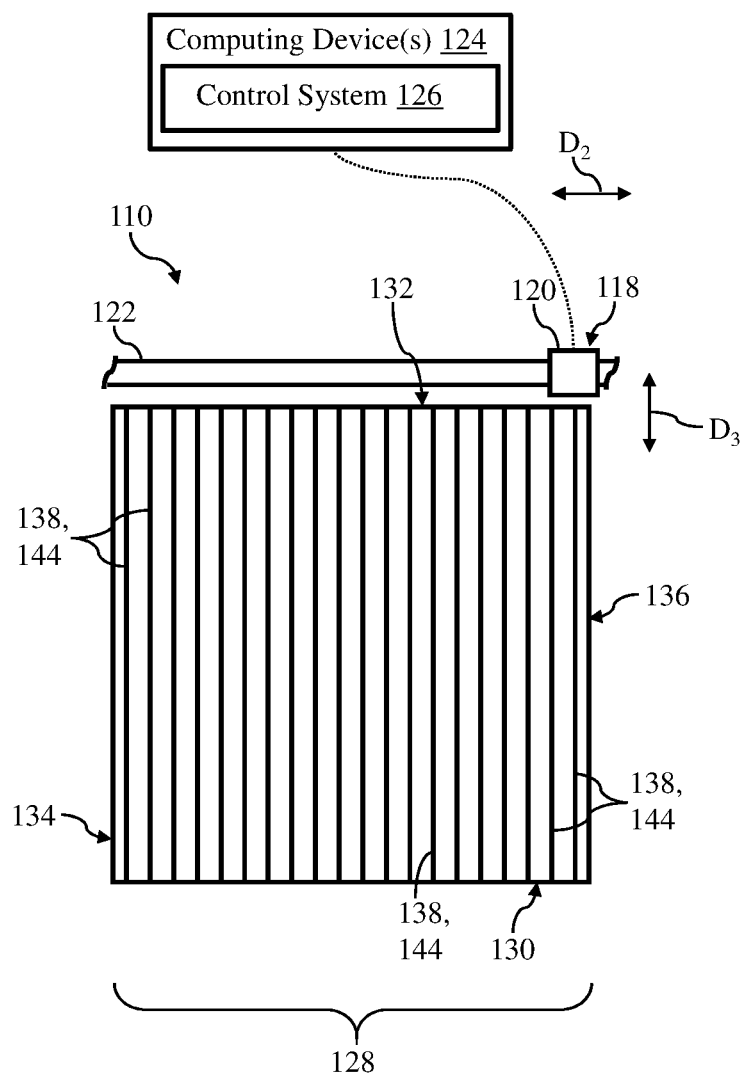

FIGS. 6 and 7 depict top views of layer 110 of component 106 undergoing a sintering process performed by AMS 100, according to embodiments. Specifically, FIG. 6 shows layer 110 partially sintered by sintering device 118 following exposure pattern 128, and FIG. 7 shows layer 110 completely sintered by sintering device 118 after following exposure pattern 128. As discussed herein, sintering device 118 may be formed, for example, as a laser. As such, sintering device 118 may follow and/or move in accordance with exposure pattern 128 and emit light that may sinter powder material 104 to form layer 110 and/or a core portion of component 106. In the non-limiting example shown in FIGS. 6 and 7, sintering device 118 may be moved in various directions (e.g., first direction ($D_1$) (not shown), second direction ($D_2$), third direction ($D_3$)) using actuator 120 and/or track system 122 to follow exposure pattern 128. Specifically, and as similarly discussed herein with respect to FIGS. 4 and 5, sintering device 118 may move in various directions to follow exposure tracks 138 of exposure pattern 128, and form sintered tracks 144 in layer 110 of component 106. As discussed herein, exposure tracks 138 may represent a stripe, line and/or path of sintered, powder material 104 (e.g., sintered tracks 144) to form layer 110 and/or a core portion of component 106. As such, sintered tracks 144 may correspond and/or may be substantially identical to determined and/or generated exposure tracks 138 of exposure pattern 128. That is, and as shown in FIGS. 6 and 7, sintered tracks 144 may extend completely and/or continuously (e.g., not segmented) between two ends, boundaries, a perimeter and/or sides 130, 132 of layer 110 of component 106. To form sintered tracks 144 for sintered component 106, computing device(s) 124 and/or control system 126 may operate and/or turn on sintering device 118 adjacent a side (e.g., sides 130) and may continuously operation sintering device 118 as AMS 100, and specifically, actuator 120 and/or track system 122, move sintering device 118 along exposure tracks 138 and/or exposure pattern 128. Once sintering device 118 is positioned adjacent a distinct side (e.g., side 132) computing device(s) 124 and/or control system 126 may discontinue operation and/or turn off sintering device 118 prior to sintering device 118 reach and/or being positioned directly over distinct side 132 to avoid sintering device 118 from sintering an outer portion and/or external surface of component 106. Sintering device 118 may then be moved and/or positioned adjacent previously formed sintered track 144, and computing device(s) 124 and/or control system 126 may once again continuously operate and/or turn on sintering device 118 and sintering device 118 may move along distinct exposure tracks 138 to form a distinct sintered track 144.

It is understood, and as discussed herein, sintering device 118 may move in a distinct pattern when following exposure pattern 128 than that shown and discussed herein with respect to FIGS. 4-7. That is, sintering device 118 may move in a random path and/or in an unsequential order when forming sintered tracks 144 of exposure pattern 128. In a non-limiting example, sintering device 118 may form the two closest sintered tracks 144 positioned adjacent to side 134, and then may move toward side 136 and form the two closest sintered tracks 144 positioned adjacent to side 136. As a result, the remaining exposure tracks 138 of exposure pattern 128 may not yet be formed. In the non-limiting example, sintering device 118 may substantially between side 134 and side 136 and may form at least one centrally positioned sintered track 144 before forming the remaining sintered tracks 144 of exposure pattern 128. In another non-limiting example, the movement of sintering device 118 may be random and may form each sintered track 144 of exposure pattern 128 in a random order. Additionally, the order in which sintered tracks 144 of exposure pattern 128 are formed may differ from layer-to-layer (e.g., layer 110).

Figure 8:
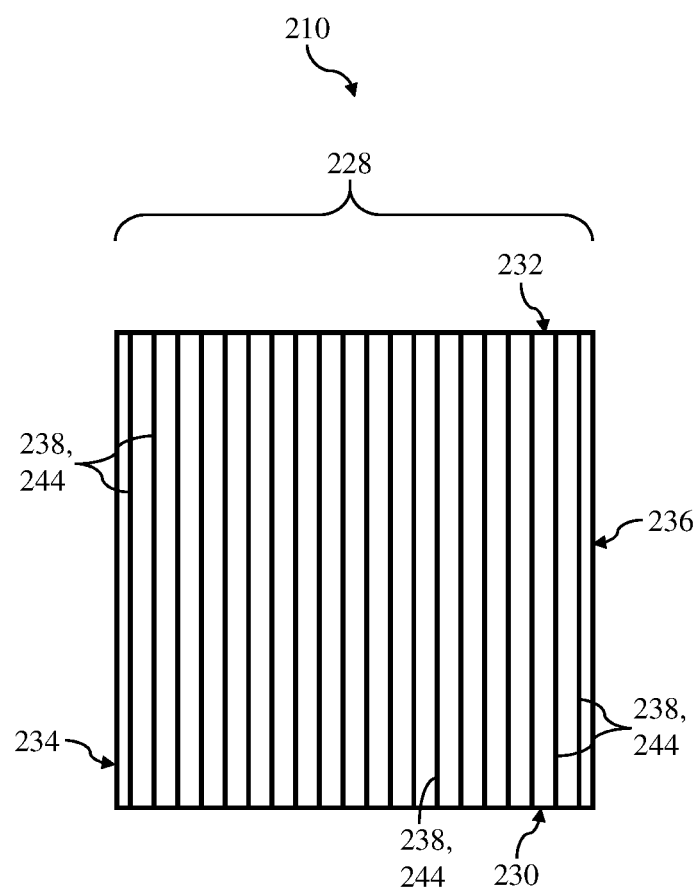
FIG. 8 depicts the component of FIG. 1 including a distinct sintered layer and the sintered exposure pattern formed by the sintering device, according to embodiments.
Figure 9:
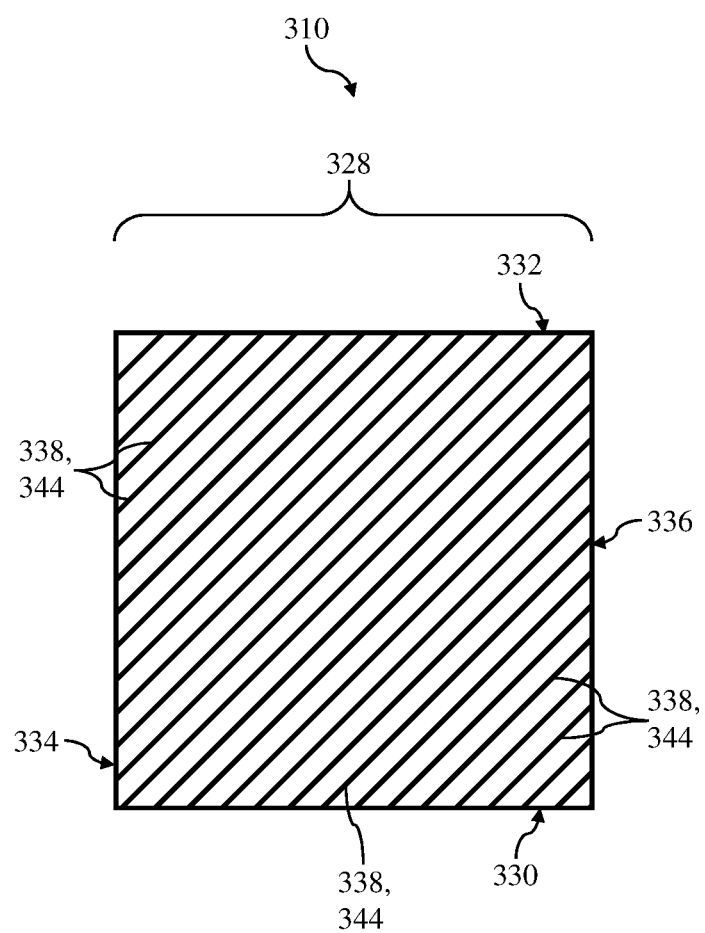
FIG. 9 depicts the component of FIG. 1 including a distinct sintered layer and the sintered exposure pattern formed by the sintering device, according to additional embodiments.

FIGS. 8 and 9 depict non-limiting examples of distinct layers 210, 310 of component 106 (see, FIGS. 1 and 2), according to embodiments. Distinct layers 210, 310 may be positioned directly adjacent layer 110 shown in FIGS. 1-7, or alternatively, may be separated from layer 110 by at least one other, distinct layer of powder material 104 forming component 106. With comparison to FIG. 7, layer 210 shown in FIG. 8 may be formed substantially similar or identical to layer 110. That is, exposure pattern 228 of layer 210 of FIG. 8 may be substantially similar or identical to exposure pattern 128 of layer 110 shown in FIG. 7. As such, exposure tracks 238 and/or sintered tracks 244 of exposure pattern 228 may be substantially similar, identical and/or extending in a similar orientation as exposure tracks 138 and/or sintered tracks 144 of exposure pattern 128.

Conversely, and with comparison to FIG. 7, layer 310 shown in FIG. 9 may be formed in a distinct manner than layer 110. That is, exposure pattern 328 of layer 310 of FIG. 9 may be distinct from exposure pattern 128 of layer 110 shown in FIG. 7. As such, exposure tracks 338 and/or sintered tracks 344 of exposure pattern 328 may also be distinct and/or extending in a distinct or different orientation than exposure tracks 138 and/or sintered tracks 144 of exposure pattern 128. In the non-limiting example shown in FIG. 9, and distinct from the non-limiting example shown in FIG. 7, exposure tracks 338 and/or sintered tracks 344 of exposure pattern 328 may extend in a substantially diagonal orientation on layer 110 of component 106. Specifically, and as shown in FIG. 9, a portion of exposure tracks 338 and/or sintered tracks 344 of exposure pattern 328 may extend between side 332 and side 334, while the remaining portion of exposure tracks 338 and/or sintered tracks 344 of exposure pattern 328 extend between side 330 and side 336. As discussed herein, the orientation of exposure tracks 238, 338 of exposure patterns 228, 238 extending between sides of layer 110 may be dependent, at least in part, on characteristics of component 106.

Figure 10:
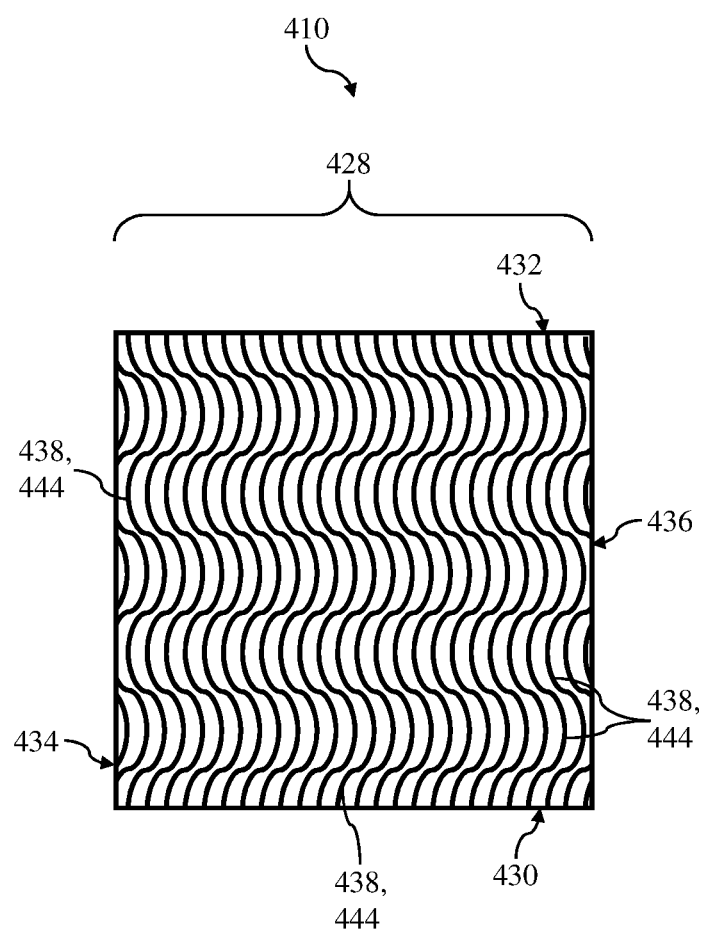
FIG. 10 depicts the component of FIG. 1 including a distinct sintered layer and a distinct sintered exposure pattern formed by the sintering device, according to further embodiments.
Figure 11:
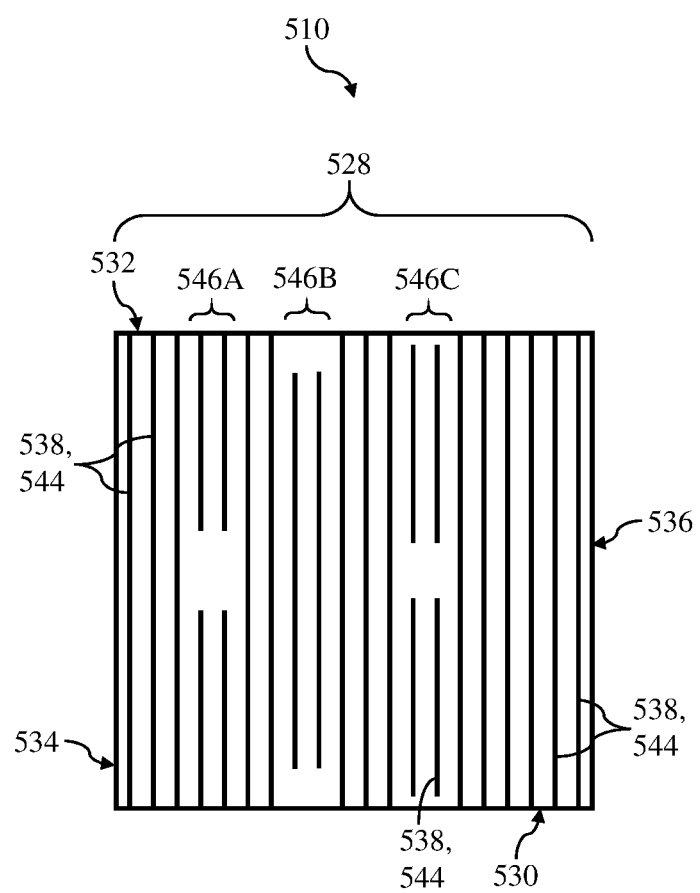
FIG. 11 depicts the component of FIG. 1 including a distinct sintered layer and distinct sintered exposure patterns formed by the sintering device, according to another embodiment.

FIGS. 10 and 11 depict additional non-limiting examples of distinct layers 410, 510 of component 106 (see, FIGS. 1 and 2), according to embodiments. Specifically, FIG. 10 depicts exposure pattern 428 including non-linear and/or non-parallel exposure tracks 438 and/or sintered tracks 444. FIG. 11 depicts exposure pattern 528 including segmented exposure tracks 538 and/or sintered tracks 544.

As shown in FIG. 10, and distinct from the non-limiting examples discussed herein with respect to FIGS. 3-9, exposure tracks 438 and/or sintered tracks 444 of exposure pattern 428 may be non-linear and/or non-parallel. That is, exposure tracks 438 and/or sintered tracks 444 of exposure pattern 428 may be formed as sintered lines that may be non-linear, may not be entirely parallel with adjacent and/or distinct exposure tracks 438 and/or sintered tracks 444, and/or may be positioned equidistant away from an adjacent exposure track 438 and/or sintered tracks 444. However, and similar to the non-limiting examples discussed herein with respect to FIGS. 3-9, the non-linear and/or non-parallel exposure tracks 438 and/or sintered tracks 444 forming exposure pattern 428 may be non-interesting and/or may not overlap. Non-linear and/or non-parallel exposure tracks 438 and/or sintered tracks 444 of exposure pattern 428 may include any geometry, shape and/or configuration. In the non-limiting example shown in FIG. 10, non-linear and/or non-parallel exposure tracks 438 and/or sintered tracks 444 may be configured and/or formed as waves. In another non-limiting example (not shown) non-linear and/or non-parallel exposure tracks 438 and/or sintered tracks 444 may be configured and/or formed as arcs and/or curvatures.

Exposure pattern 528 depicted in FIG. 11 may include segmented exposure tracks 538 and/or sintered tracks 544. Specifically, exposure pattern 528 may include at least a portion of segmented exposure tracks 538 and/or sintered tracks 544. The portion of exposure tracks 538 and/or sintered tracks 544 that may be segmented may make-up a predetermined part, amount, number, range and/or percentage of the total number of exposure tracks 538 and/or sintered tracks 544 forming exposure pattern 528 for each layer 510 of component 106 (see, FIGS. 1 and 2). In a non-limiting example, the number of segmented exposure tracks 538 and/or sintered tracks 544 may be less than the number of exposure tracks and/or sintered tracks 544 that extend between two sides 530, 532 of component 106. That is, in the non-limiting example, a majority (e.g., greater than 50%) of exposure tracks and/or sintered tracks 544 of exposure pattern 528 may extend between two sides 530, 532 of component 106. For example, the number of segmented exposure tracks 538 and/or sintered tracks 544 may make-up approximately 25 percent (25%) to approximately 5% of the total number of exposure tracks 538 and/or sintered tracks 544 forming exposure pattern 528. However, it is understood that the number of segmented exposure tracks 538 and/or sintered tracks 544 of exposure pattern 528 discussed herein is merely illustrative. As such, exposure pattern 528 may include more or less segmented exposure tracks 538 and/or sintered tracks 544 of exposure pattern 528 than the number depicted and discussed herein. Additionally, and for example, the number of segmented exposure tracks 538 and/or sintered tracks 544 may be more than the number of exposure tracks and/or sintered tracks 544 that extend between two sides 530, 532 of component 106.

As shown in FIG. 11, exposure pattern 528 may include various geometries, configurations and/or number of segments for segmented exposure tracks 538 and/or sintered tracks 544 of exposure pattern 528. In the non-limiting example, FIG. 11 depicts three distinct groups 546A, 546B, 546C of segmented exposure tracks 538 and/or sintered tracks 544 of exposure pattern 528. First group 546A may include at least two distinct portions and/or sintered lines forming each exposure track 538 and/or sintered track 544 of exposure pattern 528. In the non-limiting example shown in FIG. 11, first group 546A may include two distinct portions and/or sintered lines forming each exposure track 538 and/or sintered track 544 of exposure pattern 528. Each sintered line forming each exposure track 538 and/or sintered track 544 may be separated from each other by a gap and/or space. Additionally, and as shown in FIG. 11, each sintered line forming each exposure track 538 and/or sintered track 544 may be formed directly adjacent to and/or may contact at least one side 530, 532, 534, 536 of layer 510 of component 106 (see, FIGS. 1 and 2).

In the non-limiting example shown in FIG. 11, second group 546B may include a single portion and/or sintered line forming each exposure track 538 and/or sintered track 544 of exposure pattern 528. Each sintered line of second group 546B forming each exposure track 538 and/or sintered track 544 may be separated from at least one side 530, 532, 534, 536 of layer 510 of component 106 (see, FIGS. 1 and 2). That is, sintered line forming each exposure track 538 and/or sintered track 544 of second group 546B may be centrally located within layer 510 and/or may be separated from at least one side 530, 532, 534, 536 by a gap or space.

In the additional non-limiting example shown in FIG. 11, third group 546C may include at least two distinct portions and/or sintered lines forming each exposure track 538 and/or sintered track 544 of exposure pattern 528, similar to first group 546A. Specifically in the non-limiting example shown in FIG. 11, third group 546C may include two distinct portions and/or sintered lines forming each exposure track 538 and/or sintered track 544 of exposure pattern 528. Each sintered line forming each exposure track 538 and/or sintered track 544 may be separated from each other by a gap and/or space. Additionally, and distinct from first group 546A, each sintered line forming each exposure track 538 and/or sintered track 544 of third group 546C may be may be centrally located within layer 510 and/or may be separated from at least one side 530, 532, 534, 536 by a gap or space.

It is understood that distinct groups 546A, 546B, 546C of exposure pattern 528 are merely illustrative. As such, exposure pattern 528 may include a variety of groups 546 forming a portion of exposure track 538 and/or sintered track 544 of exposure pattern 528 that may include features and/or geometries that are unique. Additionally, the number of exposure track 538 and/or sintered track 544 in each group 546 is merely illustrative. As a result, each group 546 may include more or less exposure track 538 and/or sintered track 544 that may be segmented and/or formed adjacent sides 530, 532, 534, 536 of layer 510. Furthermore, although all three distinct groups 546 are shown and/or included in exposure pattern 528, it is understood that exposure pattern 528 may include only one or more of the groups 546 of exposure track 538 and/or sintered track 544.

Figure 12:
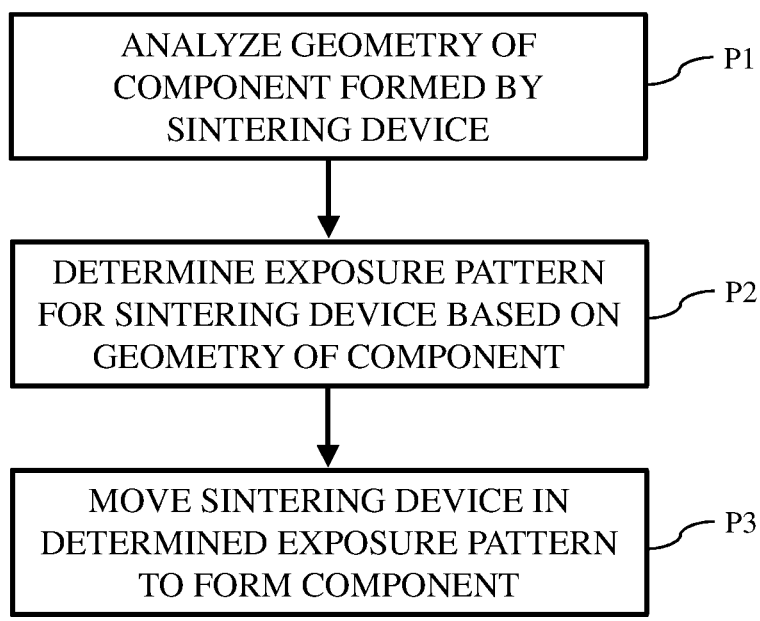
FIG. 12 depicts a flow chart of an example process for controlling movement of a sintering device of an additive manufacturing system, according to embodiments.

FIG. 12 shows a flow diagram illustrating non-limiting example processes of controlling movement of sintering device 118 of AMS 100 (see, FIGS. 1 and 2). These processes can be performed, e.g., by at least one computing device 124 including control system 126 (see, FIGS. 1 and 2), as described herein. In other cases, these processes can be performed according to a computer-implemented method of controlling movement of sintering device 118 of AMS 100. In still other embodiments, these processes can be performed by executing computer program code on computing device(s) 124, causing computing device(s) 124, and specifically control system 126, to control the movement of sintering device 118 of AMS 100. With continued reference to FIGS. 1 and 2, the processes shown in the flow diagram of FIG. 12 are discussed in detail below.

In process P1, component 106 formed by AMS 100 may be analyzed. Specifically, features and/or a geometry of component 106 that may be formed by AMS 100 may be analyzed. Analyzing the features and/or geometry of component 106 may include defining a plurality of layers of powder material 104 used to form component 106. Each layer of the plurality of layers of powder material 104 may be sintered individually by sintering device 118 to form component 106 in subsequent process(es). Analyzing the features and/or geometry of component 106 may also include determining the features and/or geometry of each of the plurality of defined layers of powder material 104 used to form component 106.

In process P2, exposure pattern 128 for sintering device 118 of AMS 100 may be determined. Determined exposure pattern 128 may be based on the features and/or geometry of component 106. That is, determined exposure pattern 128 may be based on the analyzed geometry of component 106, and more specifically, may be based on the defined plurality of layers of powder material 104 forming component 106 and/or the determined features and/or geometry of each of the plurality of layers forming component 106. The exposure pattern 128 may include at least one exposure track(s) 138. Exposure track(s) 138 of may extend completely and/or continuously between two ends, boundaries, a perimeter and/or sides 130, 132, 134, 136 of layer 110 of component 106. In a non-limiting example, exposure pattern 128 may include a plurality of exposure tracks 138. The plurality of exposure tracks 138 may be positioned substantially adjacent and formed to be substantially non-intersecting and/or parallel to each other, and may extend between two ends, boundaries, a perimeter and/or sides 130, 132, 134, 136 of layer 110 of component 106. The number of exposure track(s) 138 included within exposure pattern 128 may be dependent, at least in part, on the features and/or geometry of the layer 110 of component 106.

Determining the exposure pattern 128 may include determining exposure pattern 128 for sintering device 118 for each of the plurality of layers (e.g., layer 110, 210, 310) of powder material 104 sintered to form component 106. Specifically, determining exposure pattern 128 for each of the plurality of layers may include determining exposure pattern 128 for a first layer 110 of the plurality of layers of powder material 104 and/or component 106, and determining exposure pattern 228, 328 for at least one distinct or second layer 210, 310. Exposure patterns 128, 228, 328 for each of first layer 110 and second layer 210, 310 may include exposure track(s) 138, 238, 338. Exposure track(s) 138 of exposure pattern 128 for first layer 110 may extend in a first orientation, and exposure track(s) 238, 338 of exposure pattern 228, 328 for distinct or second layer 210, 310 may extend in a second orientation. In non-limiting examples, the first orientation of exposure track(s) 138 for first layer 110 may be substantially similar to, or distinct from, the second orientation of exposure track(s) 238, 338 for second layer 210, 310. The orientation of exposure track(s) 138, 238, 338 may be dependent, at least in part, on the features and/or geometry of the corresponding layer 110, 210, 310 of component 106.

In process P3, sintering device 118 of AMS 100 may be moved in the determined exposure pattern 128. More specifically, sintering device 118 may be moved in the determined exposure pattern 128, 228, 328 using other components of AMS 100 (e.g., actuator 120, track system 122), to form and/or sinter powder material 104 to form component 106. Sintering device 118 may be moved in the determined exposure pattern 128 for each layer of the plurality of layers (e.g., layer 110, 210, 310) to sinter each layer individually when forming component 106. In the non-limiting example where exposure pattern 128, 228, 328 includes a plurality of exposure tracks 138, 238, 338, moving sintering device 118 in the determined exposure pattern 128 may include continuously operating (e.g., turning on laser forming sintering device 118) sintering device 118 to form a first sintered track 144 corresponding to one of the plurality of exposure tracks 138 of exposure pattern 128. In the non-limiting example, moving sintering device 118 may also include, discontinuing operation (e.g., turning off laser forming sintering device 118) of sintering device 118 in response to sintering device 118 being positioned directly adjacent to and/or prior to sintering device 118 reaching one side 130, 132, 134, 136 of component 106, and subsequently repositioning sintering device 118, using actuator 120 and/or track system 122, directly adjacent first sintered track 144. Additionally, moving sintering device 118 in the non-limiting example may include continuously operating sintering device 118 to form a distinct sintered track 144 corresponding to a distinct one of the plurality of exposure tracks 138 of exposure pattern 128. Distinct sintered track 144 may be formed substantially adjacent, substantially non-intersecting and/or substantially parallel to first sintered track 144.

Processes P1-P3 may be performed repeatedly for each of the plurality of layers (e.g., layers, 110, 210, 310) forming component 106 until the final layer is formed and component 106 is completely built and/or created by AMS 100. Subsequently, component 106 may be removed from AMS 100 and may be exposed to any variety of finishing processes, e.g., minor machining, sealing, polishing, assembly to another part, etc. Once formed by AMS 100, and finished by undergoing the finishing processes, component 106 may be utilized for its intended purpose (e.g., installed into a system or component that utilizes component 106 for function and/or operation).

Figure 13:
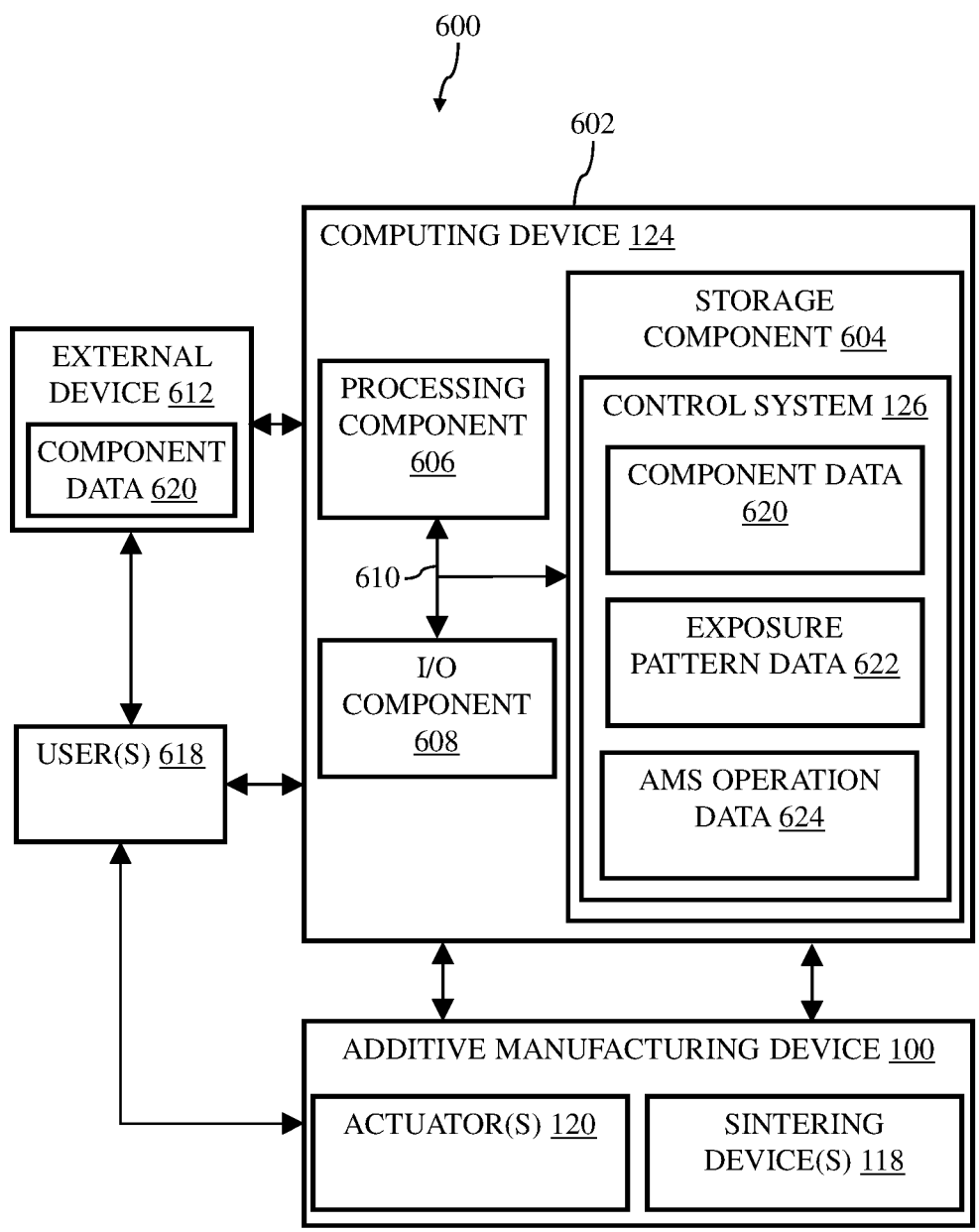
FIG. 13 depicts an environment including a control system for controlling movement of the sintering device of the additive manufacturing system of FIGS. 1 and 2, according to embodiments.

FIG. 13 shows an illustrative environment 600. To this extent, environment 600 includes computer infrastructure 602 that can perform the various process steps described herein for controlling operations of AMS 100 including controlling the movement of sintering device 118 when sintering powder material 104 to form component 106 (see, FIG. 1). In particular, computer infrastructure 602 is shown including computing device 124 that comprises control system 126, which enables computing device 124 to control operation of AMS 100 by performing one or more of the process steps of the disclosure.

Computing device 124 is shown including a storage component 604 (e.g., non-transitory computer readable storage medium), a processing component 606, an input/output (I/O) component 608, and a bus 610. Further, computing device 124 is shown in communication with AMS 100, sintering device 118 and/or actuator 120. As is known in the art, in general, processing component 606 executes computer program code, such as control system 126, that is stored in storage component 604 or an external storage component 612. While executing computer program code, processing component 606 can read and/or write data, such as control system 126, to/from storage component 604 and/or I/O component 608. Bus 610 provides a communications link between each of the components in computing device 124. I/O component 608 can comprise any device that enables a user 618 to interact with computing device 124 or any device that enables computing device 124 to communicate with one or more other computing devices. Input/output devices (including but not limited to keyboards, displays, pointing devices, etc.) can be coupled to the system either directly or through intervening I/O controllers.

In any event, computing device 124 can comprise any general purpose computing article of manufacture capable of executing computer program code installed by a user 618 (e.g., a personal computer, server, handheld device, etc.). However, it is understood that computing device 124 and control system 126 are only representative of various possible equivalent computing devices that may perform the various process steps of the disclosure. To this extent, in other embodiments, computing device 124 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 602 is only illustrative of various types of computer infrastructures for implementing the disclosure. For example, in one embodiment, computer infrastructure 602 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed herein, control system 126 enables computing infrastructure 602 to control operation of AMS 100. To this extent, control system 126 is shown including component data 620, exposure pattern data 622 and sintering device operational data 624. Component data 620 may include program code related to component 106 (see, FIGS. 1 and 2) intended to be built by AMS 100, which may include information and/or data specific to the features, geometry and/or layers of component 106, as discussed herein. Exposure pattern data 622 may include program code that can create and/or generate sintering patterns and/or exposure patterns 128 including exposure track(s) 138 (see, FIG. 3) that may be followed by sintering device 118 of AMS 100 when forming component 106. As discussed herein, the generated exposure patterns 128 may be based on information (e.g., features, geometry, layers and so on) specific to component 106 that may be obtained and/or analyzed from component data 620. AMS operation data 624 may include program code specific to controlling the operation of AMS 100 and specifically, sintering device 118 and/or actuator 120 when performing the process of sintering layers of powder material 104 to form component 106, as discussed herein. Additionally operation of each of these data is discussed further herein. However, it is understood that some of the various data shown in FIG. 13 can be implemented independently, combined, and/or stored in memory for one or more separate computing devices that are included in computer infrastructure 102. Further, it is understood that some of the data and/or functionality may not be implemented, or additional data and/or functionality may be included as part of environment 600. In a non-limiting example, component data 620 may be stored on external storage device 612.

As discussed herein, component data 620 may include program code related to component 106 (see, FIGS. 1 and 2) intended to be built by AMS 100, which may include information and/or data specific to the features, geometry and/or layers of component 106. The program code of component data 620 may include a precisely defined 3D model of component 106 and can be generated from any of a large variety of well-known computer aided design (CAD) software systems such as AutoCAD®, TurboCAD®, DesignCAD 3D Max, etc. In this regard, the program code of component data 620 can take any now known or later developed file format. For example, the program code of component data 620 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. The program code of component data 620 may be translated between different formats, converted into a set of data signals and transmitted, received as a set of data signals and converted to code, stored, etc., as necessary. The program code of component data 620 may be an input to computing device 124 and/or storage component 604, and may come from a part designer, an intellectual property (IP) provider, a design company, user(s) 618 of computing device 124, external storage device 612, or from other sources. As discussed herein, computing device 124 and/or control system 126 executes the program code of component data 620, and divides component 106 (see, FIGS. 1 and 2) into a series of defined layers (e.g., layer 110, 210, 310), which may be individually sintered after formation by sintering device 118 to form sintered component 106.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., obtaining component data 620 for component 106, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s). As used herein, "approximately" indicates +/−10% of the value, or if a range, of the values stated.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An additive manufacturing system, comprising:
 a sintering device configured to sinter a powder material to form a component;
 an actuator coupled to the sintering device, the actuator configured to adjust a position of the sintering device; and
 at least one computing device operably connected to the actuator and the sintering device, the at least one computing device configured to control a movement of the sintering device by performing processes including:
  determining an exposure pattern for the sintering device for sintering the powder material based on a geometry of the component, the exposure pattern including a plurality of exposure tracks extending between two sides of the component and including:
   a first exposure track extending between two sides of the component in a predetermined orientation, and
   a second, segmented exposure track extending at least partially between the two sides of the component in the predetermined orientation and positioned adjacent the first exposure track, the second, segmented exposure track including a gap separating distinct segments of the second, segmented exposure track; and
  moving the sintering device, using the actuator, in the determined exposure pattern to sinter the powder material to form the component.

2. The additive manufacturing system of claim 1, wherein the processes performed by the at least one computing device to control the movement of the sintering device further includes:
 defining a plurality of layers of the powder material, each layer of the plurality of layers of powder material sintered individually by the sintering device to form the component; and
 determining the geometry of each of the plurality of layers of the powder material.

3. The additive manufacturing system of claim 2, wherein the at least one computing device is configured to determine the exposure pattern for the sintering device by performing processes including:
 determining the exposure pattern for the sintering device for each of the plurality of layers of the powder material forming the component.

4. The additive manufacturing system of claim 3, wherein the at least one computing device is configured to determine the exposure pattern for the sintering device for each of the plurality of layers of the powder material by performing processes including:
 determining the exposure pattern for the sintering device for a first layer of the plurality of layers of the powder material, the exposure pattern for the first layer of the plurality of layers of the powder material including a first plurality of exposure tracks extending in a first orientation; and
 determining the exposure pattern for the sintering device for a second layer of the plurality of layers of the powder material, the exposure pattern for the second layer of the plurality of layers of the powder material including a second plurality of exposure tracks extending in a second orientation, distinct from the first orientation.

5. The additive manufacturing system of claim 1, wherein the each of the plurality of exposure tracks are positioned non-intersecting to each other.

6. The additive manufacturing system of claim 1, wherein the at least one computing device is configured to move the sintering device in the determined exposure pattern to sinter the powder material by performing processes including:
 continuously operating the sintering device to form a first sintered track corresponding to the first exposure track of the plurality of exposure tracks of the exposure pattern;

discontinuing operation of the sintering device in response to the sintering device being positioned directly adjacent to one of the two sides of the component;
repositioning the sintering device, using the actuator, directly adjacent to the first sintered track; and
continuously operating the sintering device to form a distinct sintered track corresponding to a third exposure track of the plurality of exposure tracks of the exposure pattern, the distinct sintered track formed non-intersecting to the first sintered track and extending between the two sides of the component.

7. The additive manufacturing system of claim 1, wherein the plurality of exposure tracks include:
a first portion of the plurality of exposure tracks extending between two sides of the component, the first portion including the first exposure track; and
a second portion of the plurality of exposure tracks extending partially between two sides of the component, the second portion including the second, segmented exposure track,
wherein the second portion of the plurality of exposure tracks includes less exposure tracks that extend partially between two sides of the component than the first portion of the plurality of exposure tracks that extend between two sides of the component.

8. The additive manufacturing system of claim 1, wherein each of the distinct segments of the second, segmented exposure track are positioned on a corresponding side of the two sides of the component or separated from and adjacent the corresponding side of the two sides of the component.

9. The additive manufacturing system of claim 1, wherein the plurality of exposure tracks of the exposure pattern includes a third exposure track, the third exposure track positioned adjacent and separated from the two sides of the component by a space.

10. A computer program product comprising program code, which when executed by at least one computing device, causes the at least one computing device to control a movement of a sintering device of an additive manufacturing system, by performing processes including:
determining an exposure pattern for the sintering device based on a geometry of a component formed from a powder material by the sintering device, the exposure pattern including a plurality of exposure tracks extending between two sides of the component and including:
a first exposure track extending between two sides of the component in a predetermined orientation, and
a second, segmented exposure track extending at least partially between the two sides of the component in the predetermined orientation and positioned adjacent the first exposure track, the second, segmented exposure track including a gap separating distinct segments of the second, segmented exposure track; and
moving the sintering device in the determined exposure pattern to sinter the powder material to form the component.

11. The computer program product of claim 10, wherein the program code causes the at least one computing device to:
define a plurality of layers of the powder material, each layer of the plurality of layers of powder material sintered individually by the sintering device to form the component; and
determine the geometry of each of the plurality of layers of the powder material.

12. The computer program product of claim 11, wherein the determining of the exposure pattern for the sintering device includes:
determining the exposure pattern for the sintering device for each of the plurality of layers of the powder material forming the component.

13. The computer program product of claim 12, wherein the determining of the exposure pattern for the sintering device for each of the plurality of layers of the powder material includes:
determining the exposure pattern for the sintering device for a first layer of the plurality of layers of the powder material, the exposure pattern for the first layer of the plurality of layers of the powder material including a first plurality of exposure tracks extending in a first orientation; and
determining the exposure pattern for the sintering device for a second layer of the plurality of layers of the powder material, the exposure pattern for the second layer of the plurality of layers of the powder material including a second plurality of exposure tracks extending in a second orientation, distinct from the first orientation.

14. The computer program product of claim 10, wherein the each of the plurality of exposure tracks are positioned non-intersecting to each other.

15. The computer program product of claim 10, wherein moving the sintering device in the determined exposure pattern to sinter the powder material includes:
continuously operating the sintering device to form a first sintered track corresponding to the first exposure track of the plurality of exposure tracks of the exposure pattern;
discontinuing operation of the sintering device in response to the sintering device being positioned directly adjacent to one of the two sides of the component;
repositioning the sintering device, using the actuator, directly adjacent to the first sintered track; and
continuously operating the sintering device to form a distinct sintered track corresponding to a third exposure track of the plurality of exposure tracks of the exposure pattern, the distinct sintered track formed non-intersecting to the first sintered track and extending between the two sides of the component.

16. A system comprising:
at least one computing device operably connected to a sintering device and an actuator of an additive manufacturing system, the at least one computing device configured to control a movement of the sintering device by performing processes including:
determining an exposure pattern for the sintering device based on a geometry of a component formed from a powder material by the sintering device, the exposure pattern including:
a plurality of non-linear exposure tracks positioned non-intersecting to each other, at least a majority of the plurality of non-linear exposure tracks of the exposure pattern extending between two sides of the component; and
moving the sintering device, using the actuator, in the determined exposure pattern to sinter the powder material to form the component.

17. The system of claim 16, wherein the processes performed by the at least one computing device to control the movement of the sintering device further includes:

defining a plurality of layers of the powder material, each layer of the plurality of layers of powder material sintered individually by the sintering device to form the component; and determining the geometry of each of the plurality of layers of the powder material.

18. The system of claim 17, wherein the at least one computing device is configured to determine the exposure pattern for the sintering device by performing processes including:

determining the exposure pattern for the sintering device for each of the plurality of layers of the powder material forming the component.

19. The system of claim 18, wherein the at least one computing device is configured to determine the exposure pattern for the sintering device for each of the plurality of layers of the powder material by performing processes including:

determining the exposure pattern for the sintering device for a first layer of the plurality of layers of the powder material, the exposure pattern for the first layer of the plurality of layers of the powder material including a first plurality of non-linear exposure tracks extending in a first orientation; and determining the exposure pattern for the sintering device for a second layer of the plurality of layers of the powder material, the exposure pattern for the second layer of the plurality of layers of the powder material including a second plurality of non-linear exposure tracks extending in a second orientation, distinct from the first orientation.

20. The system of claim 16, wherein the plurality of exposure tracks of the determined exposure pattern includes one of:

a first portion of the non-linear plurality of exposure tracks extending partially between two sides of the component, or a second portion of the non-linear plurality of exposure tracks being segmented and including a gap separating distinct segments of the second portion of the non-linear plurality of exposure tracks.

* * * * *